United States Patent Office 2,763,360
Patented Sept. 18, 1956

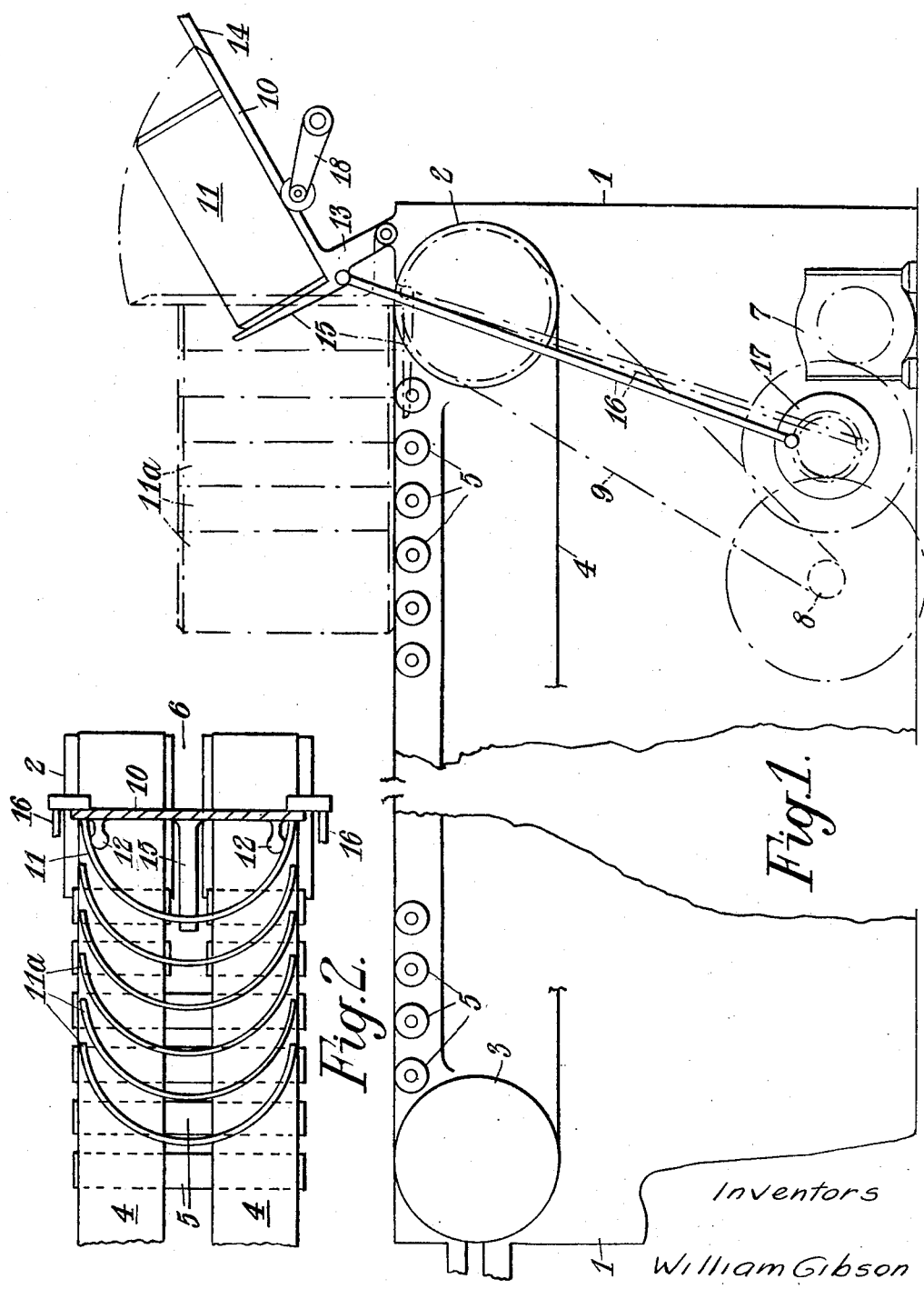

2,763,360

ASSEMBLY UNIT FOR A CONVEYOR SYSTEM

William Gibson and Edward Frank Thomson, London, England, assignors to Daily Mirror Newspapers Limited, London, England Application June 20, 1952, Serial No. 294,738

Claims priority, application Great Britain July 2, 1951

7 Claims. (Cl. 198—35)

This invention consists in an assembly unit for a conveyor system, comprising a movable table, and drive means actuable by switch means responsive to the discharge of an article from a conveyor system on to said table to move the latter, in operation, through a predetermined distance, whereby a succession of articles may be assembled along the conveyor table with regular spacing irrespective of the frequency of discharge from the conveyor system and an up-ending device, adapted to receive the articles successively from a conveyor system, up-end them and discharge them on to the movable table.

Thus, the up-ending device may comprise an article-receiving member such as a platform, the member being pivoted and associated with a drive means and with said switch so that, when an article is discharged on to said member, the latter is rotated to up-end the article and deposit it on to the movable table, which is moved in response to said switch before, during or after the up-ending operation to make room for the article referred to or for the next article to be received from the conveyor system.

In one construction, the article-receiving member may comprise a platform (which expression includes a grid, rails or the like) adapted to receive an article from a conveyor system, and a ledge, arm or arms upstanding at one side, effective as a stop to retain the article from slipping off during an up-ending operation. Where an arm is disposed at the mid-point of one side of said member, the movable table may most conveniently comprise a pair of endless, parallelly aligned belts arranged edge-to-edge but leaving a gap between them sufficient to allow this arm to enter and move below the level of the belts at the end of an up-ending operation. In this way, the narrow edge of an article can be retained by the arm until the edge reaches the movable table, when further rotation of said member will cause the arm to disengage from the edge, movement of the table then carrying the article away from the up-ending device which returns to its original position.

Where there is no objection to assembled articles overhanging the edges of the movable table, an arm may upstand at each end of one side of the platform or the like, arranged to fall below the level of the table, which may then be a single belt, at the moment an up-ended article is deposited on the table.

Conveniently, the up-ending device may be operated by a drive common with that provided for moving the table. Thus, a crank mechanism may be provided for moving the up-ending device from an article-receiving to an article-depositing position and back to an article-receiving position, the table drive being arranged to move the table through an appropriate predetermined distance during this cycle. Clutch mechanism or the like may be provided in case it may be desired to move the conveyor table independently of the up-ending device.

The accompanying drawings show diagrammatically one embodiment of this invention, of which Figure 1 is a side elevation, whilst Figure 2 is a plan view of the right hand end of Figure 1 with the up-ending device in the vertical position.

The unit comprises a frame 1 supporting movable table formed by the upper surface of a belt conveyor assembly comprising a driven roller 2, a second roller 3, endless belts 4 and small supporting rollers 5, the latter rollers extending the full width of the conveyor whilst each belt 4 is somewhat narrower than half the width of the conveyor to define a central gap 6. For driving the belts there is provided a motor 7 geared to a pulley 8 coupled by a belt drive 9 to the roller 2.

The assembly unit further comprises an up-ending device in the form of a plate 10 adapted to carry a stereo plate 11, the plate being formed with guide rails 12 to prevent the stereo plate from slipping sideways off the device. The plate 10 is mounted on an arm 13 pivoted by arms 13 to the frame 1 so that, in the inclined position shown in full line in Figure 1, a stereo plate such as 11 sliding down a conveyor, an end fragment of which is shown at 14, will run on to the plate 10 and be brought to rest by an arm 15 upstanding at the lower end of the plate 10. This arm 15 is positioned so that, when the plate 10 is swung from an inclined position to the vertical position shown in dotted line in Figure 1, it enters the gap 6 and sinks somewhat below the level of the belts 4, thereby depositing the stereo plate 11 in a free standing condition on the belts 4. For reciprocating the up-ending device between the plate-receiving and the plate-depositing positions there is provided a crank rod 16 coupling the lower end of plate 10 to a rotary drive 17 coupled to the motor 7 and for actuating the motor 7 so that this reciprocation takes place only on receipt of a stereo plate by the up-ending device there is provided switch means 18 mechanically actuated by stereo plate 11. This switch means 18 projects through a slot 19 in the plate 10 so as to be depressed by the stereo plate. Switch means 20 is arranged to switch off motor 7 when the up-ending device returns to the plate-receiving position. The rotary drive 17 and the belt drive 9 are both coupled to the same motor 7 so that the belts 4 are only moved through a predetermined distance in response to the arrival of stereo plate 11 on the up-ending device, this resulting in the horizontal stacking of a succession of plates, marked 11a, on the movable table.

The term "inclined position" is used throughout the specification and claims in a sufficiently broad sense as to include a horizontal position.

What we claim is:

1. An assembly unit for a conveyor system, comprising an assembly table, a motor for driving the assembly table, a pivotally mounted support adapted to individually receive articles delivered successively from the conveyor system, mechanism actuable by the motor for rocking the support back and forth about its pivotal mounting for moving an article from inclined to up-ended positions onto the assembly table, and control means positioned adjacent the support and in the path of travel of articles passing onto the support for intermittently operating the motor, whereby a succession of articles may be up-ended and delivered onto the assembly table with regular spacing irrespective of the frequency of discharge from the conveyor system.

2. An assembly unit for a conveyor system, comprising an assembly table, an electric-motor drive means actuable to move the assembly table step-by-step, a pivotally mounted up-ending device adapted to receive articles delivered successively from the conveyor system, mechanism actuated by the motor for rocking the up-ending device about its pivotal mounting to move an article from inclined to up-ended position onto the assembly table, a control switch located in the path of travel of articles passing onto the up-ending device in the inclined position of the up-ending device, said control switch being adapted to be connected in electrical circuit with the motor for operating the motor only during contact of an article with the switch, whereby a succession of articles may be assembled in up-ended position along the assembly table with regular spacing irrespective of the frequency of discharge of articles from the conveyor system.

3. An assembly unit as set forth in claim 2, wherein the up-ending device comprises a pivoted platform, drive means for the platform arranged to reciprocate the latter, on actuation, from an article-receiving position to an article-depositing position and back again, switch means responsive to the discharge of an article on to the platform to actuate the platform drive means, and a stop upstanding at that side of the platform which is lowermost during an up-ending operation, such stop dropping below the level of the assembly table when the up-ended article is deposited thereon.

4. An assembly unit as set forth in claim 3 wherein the stop comprises arms upstanding one at each end of said side and positioned to fall below the level of the assembly table one each side of the latter when an article is deposited thereon by the up-ending device.

5. An assembly unit as set forth in claim 3 wherein the stop comprises an arm upstanding from the central portion of said side, the assembly table being formed with a central gap into which the arm will sink when an article is deposited on to the table by the up-ending device.

6. An assembly unit as set forth in claim 3 wherein the assembly table and pivoted platform have a common drive means with associated common switch means.

7. An assembly unit as set forth in claim 3 comprising crank mechanism coupled with said drive means for reciprocating said platform.

UNITED STATES PATENTS

References Cited in the file of this patent

| | | |
|---|---|---|
| 1,602,719 | Straight | Oct. 12, 1926 |
| 1,772,418 | Fowler | Aug. 5, 1930 |
| 1,856,976 | Strelow | May 3, 1932 |
| 1,873,846 | Meyer | Aug. 23, 1932 |
| 2,594,346 | Preis | Apr. 29, 1952 |
| 2,639,801 | Sneed | May 26, 1953 |